Dec. 19, 1950     D. SUSSIN     2,534,637
X-RAY ILLUMINATING MECHANISM
Filed March 26, 1945     5 Sheets-Sheet 1
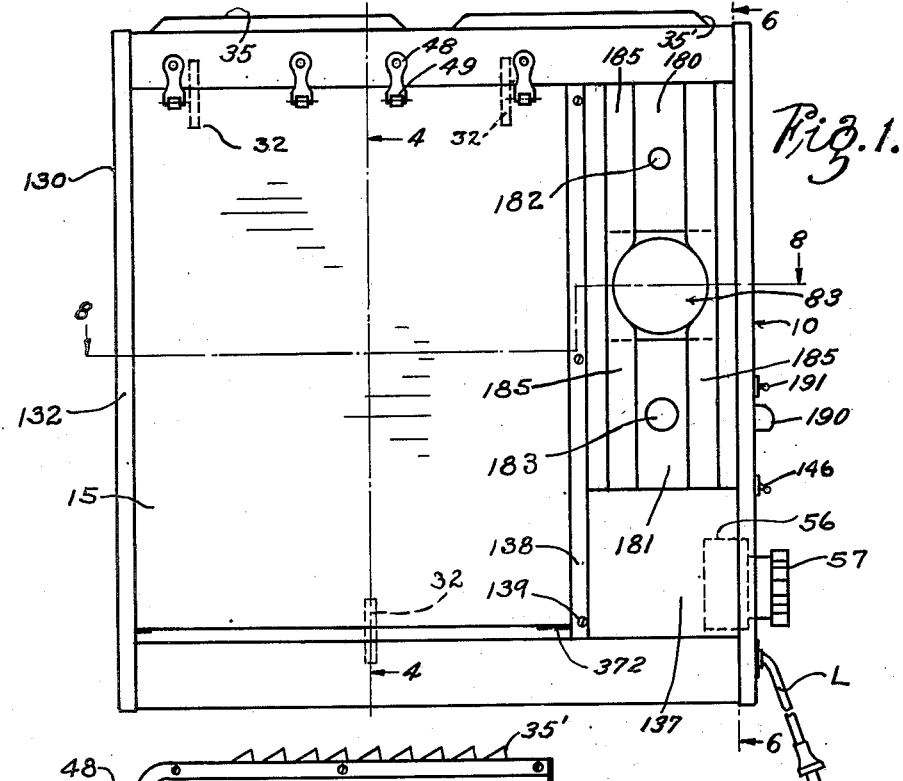
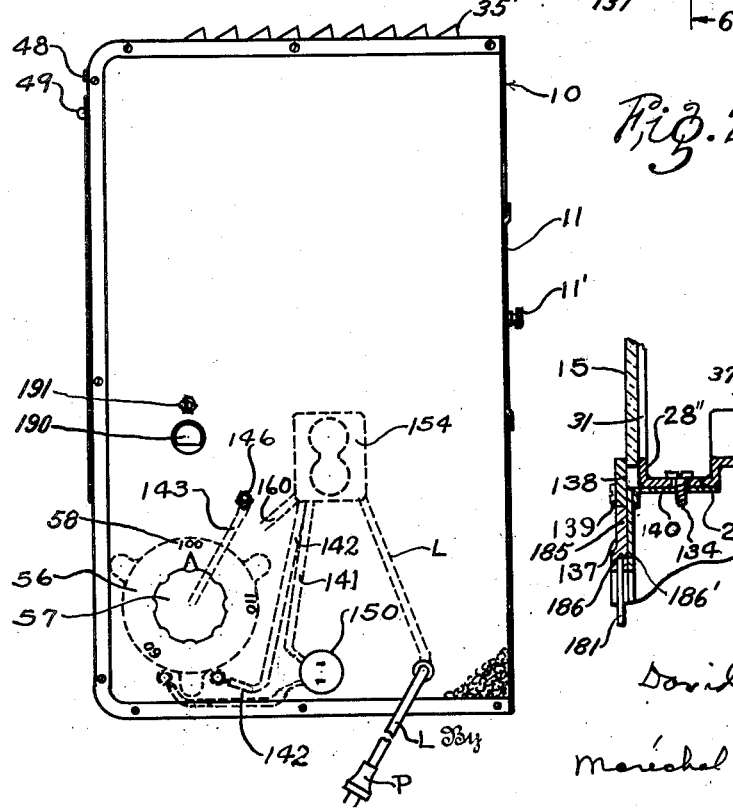
Inventor
David Sussin
Maréchal & Biebel
Attorneys

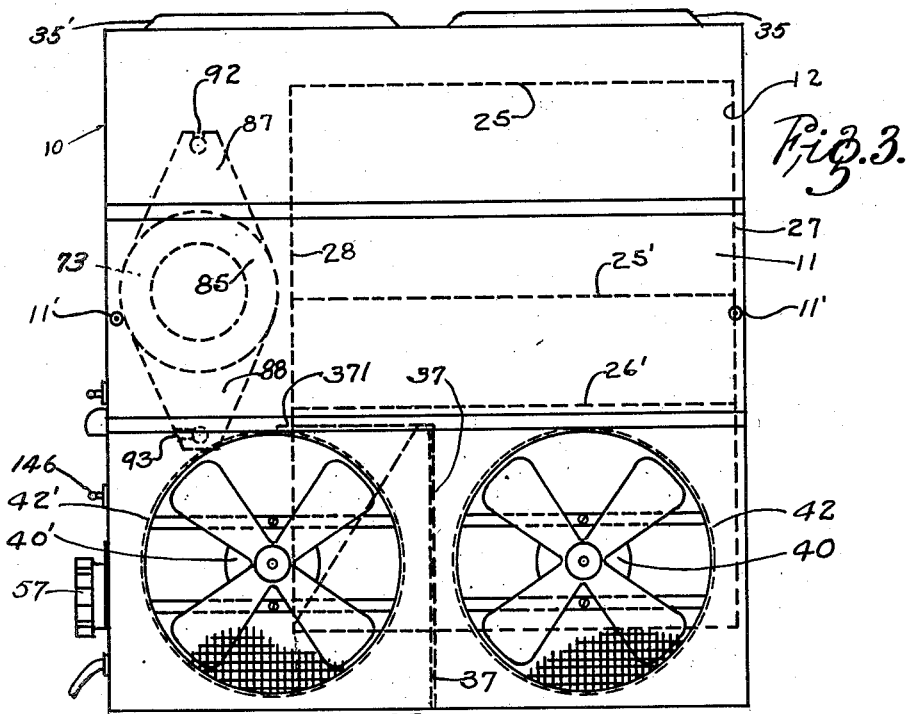
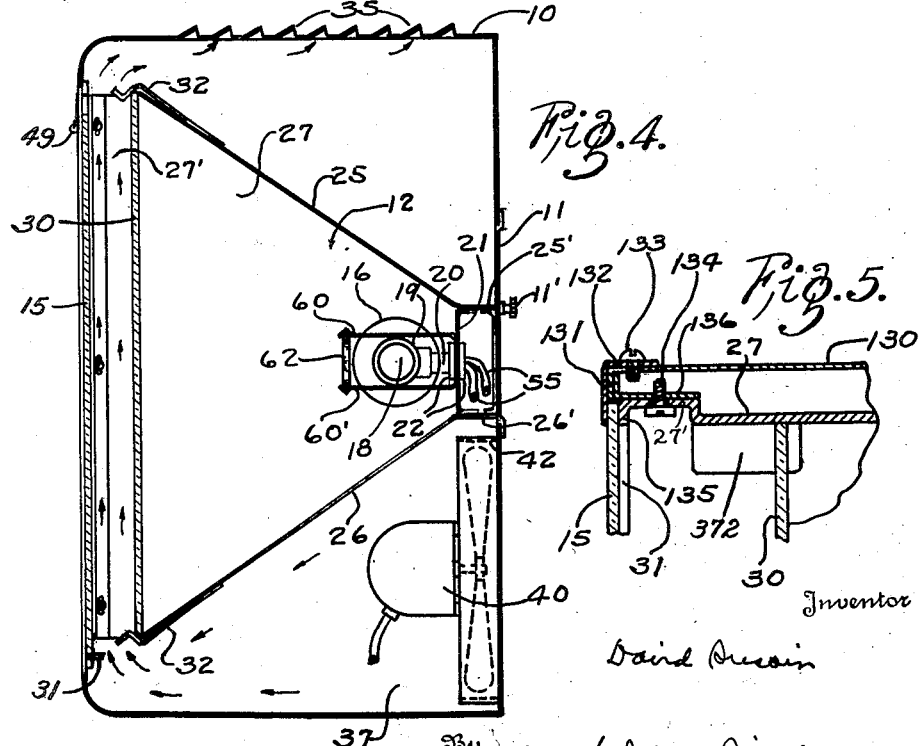

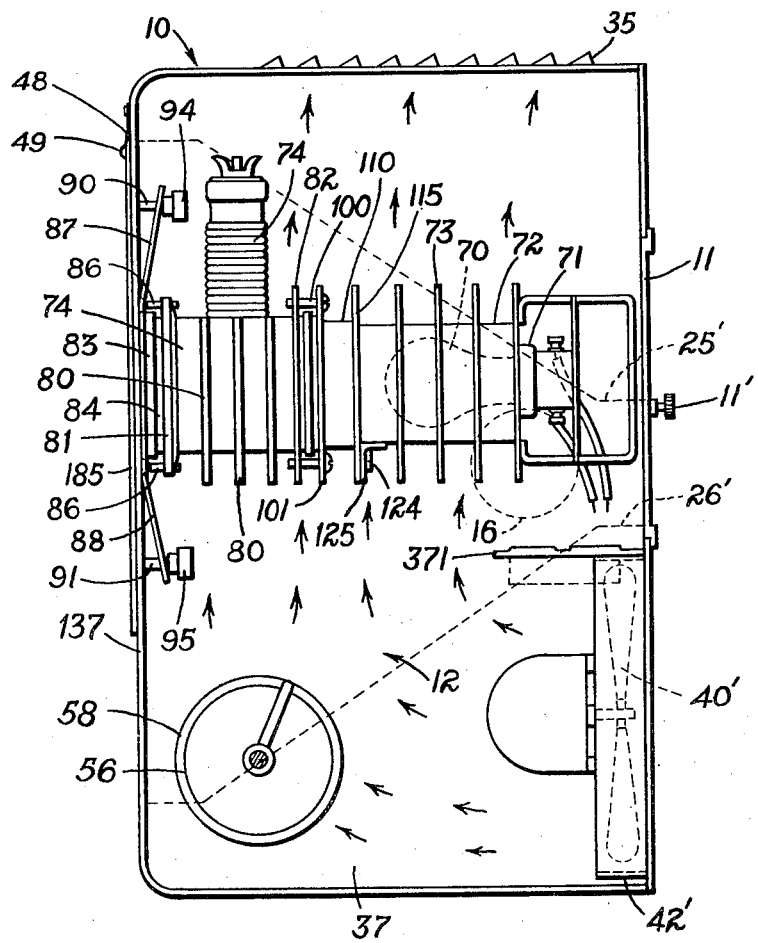

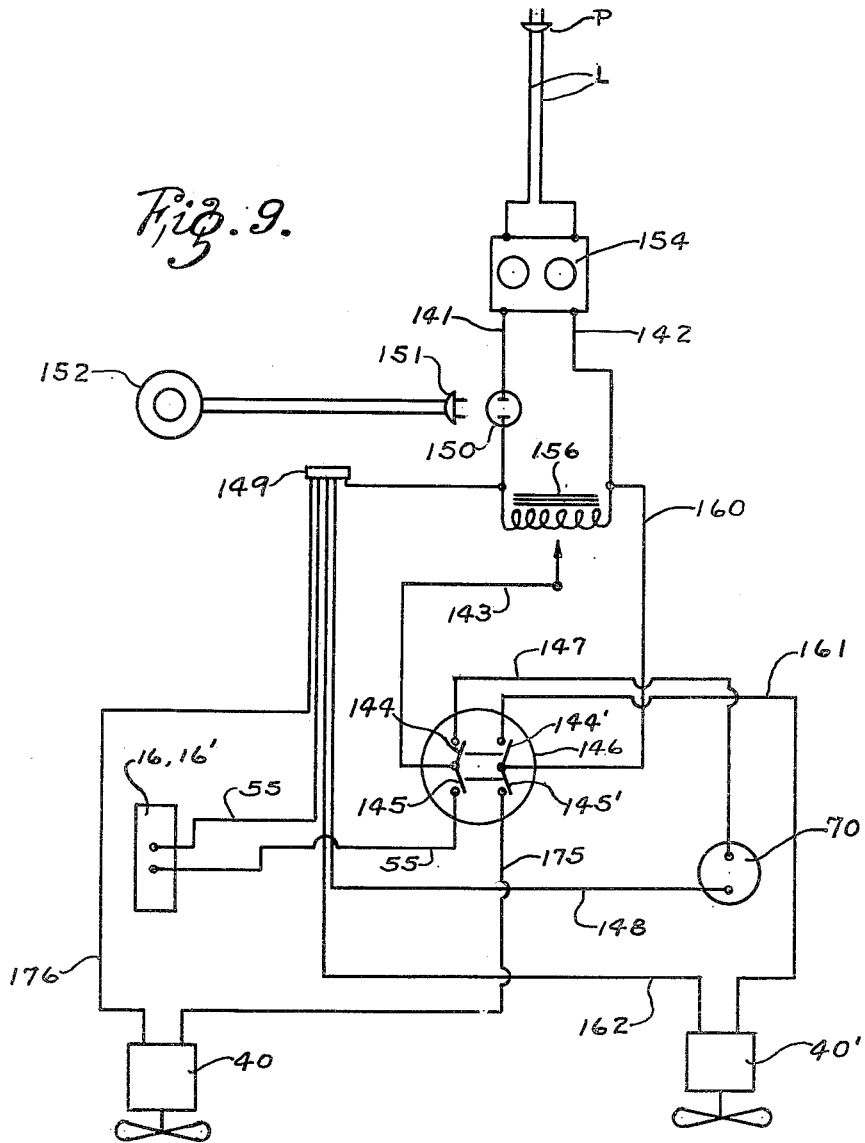

Patented Dec. 19, 1950

2,534,637

UNITED STATES PATENT OFFICE 2,534,637

X-RAY ILLUMINATING MECHANISM

David Sussin, South Fort Mitchell, Ky., assignor to The Kelley-Koett Manufacturing Company, Covington, Ky., a corporation of Ohio Application March 26, 1945, Serial No. 584,920

6 Claims. (Cl. 40—132)

This invention relates to X-ray apparatus and more particularly to apparatus for use in viewing X-ray films.

One of the principal objects of the invention is to provide apparatus for viewing X-ray films of varying densities under conditions of illumination controlled to accord with the density of the film and to permit illumination sufficiently intense for accurate appraisal of factors contained in film, having all or portions thereof of densities outside the lighting capacity of previous illuminators.

Still another object of the invention is to provide apparatus for viewing X-ray films which is provided with means for effecting varying illuminations up to very high intensity illumination, much higher than heretofore used or considered practicable, while maintaining the surface of the illuminated section sufficiently cool to prevent any objectionable effect upon the film.

Another object of the invention is to provide apparatus for viewing X-ray films in which two sources of illumination are provided, one of which comprises a large illuminated film receiving surface, with means for variable intensity of illumination over a wide range and up to much higher illumination than heretofore available to permit of taking, viewing, and appraising higher density films, and the other of which provides for illuminating a selected small area of the film under very high intensity illumination coordinated with very high density of such area; and with suitable means for maintaining the illuminated surfaces under all intensities of illumination sufficiently cool to prevent objectionable or adverse effect upon the film.

Other objects and advantages of the invention will be apparent from the description and claims and the drawing.

In the drawing, in which a preferred embodiment of the invention is illustrated, and in which like characters of reference designate like parts throughout the several views thereof:

Fig. 1 is a front elevational view of apparatus embodying the invention, illustrated for viewing X-ray film;

Fig. 2 is a side elevational view of the apparatus of Fig. 1, looking from the right, with inside parts dotted in to show general location thereof;

Fig. 3 is a rear elevational view of the apparatus of Fig. 1, with inside parts dotted in to show general location thereof;

Fig. 4 is a section on the line 4—4 of Fig. 1 looking in the direction of the arrows;

Fig. 5 is a fragmentary sectional view through one corner of the apparatus showing details of construction;

Fig. 8 is a sectional view, along the line 8—8 of Fig. 1 looking in the direction of the arrows, of the inside of the apparatus showing the spotlight and water cell in section;

Fig. 9 is a wiring diagram; and

Fig. 10 is a detail in cross section of the mounting of the right hand end of the viewing plate.

Figure 6:
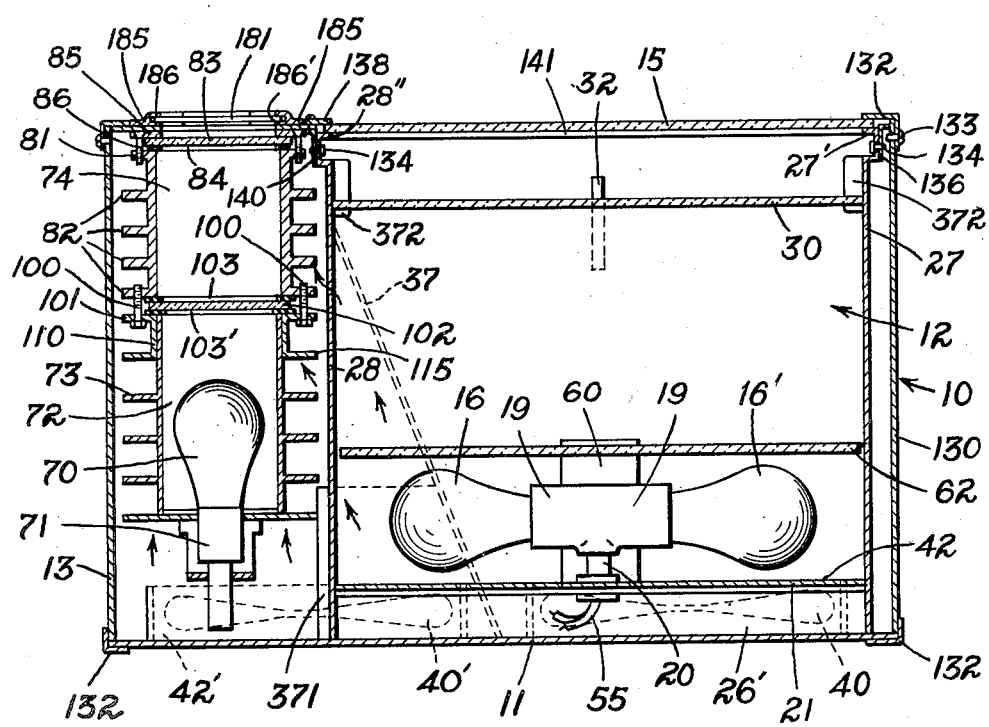
Fig. 6 is a side elevation similar to Fig. 2 but with the side plate removed and some parts shown in dotted lines and certain details omitted, the direction of the view being indicated by the line 6—6 in Fig. 1.

In most cases, the viewing of X-ray films for the detection of flaws in the object radiographed has been limited by the amount of light available for illuminating the film while it is being studied and appraised. Frequently the light source has been inadequate to permit of proper and necessary illumination of the film, with the result that accurate appraisal of many of the factors is difficult or impossible, and even with the result that vital information actually on the film cannot be seen because of lack of intensity of light to illuminate the film properly. As a result radiographers from their general experience have learned to make or develop films in densities readable on existing equipment, even though a longer exposure might supply additional information concerning the internal structure being photographed. These densities in practice are measured in terms of the well known "H & D" scale. This has been particularly true in industrial radiography, as in the examination of industrial devices, such as castings or welds, for possible flaws which are of such a nature that a high degree of contrast is required to show their presence. Also, because of differences in cross-section, shape and form, etc., a casting or the like may be such that when the image of certain portions of the device are of a photographic density on the film proper for satisfactory viewing with ordinary illuminators other portions of the image will be of a density beyond the range that can be viewed by that illuminator.

It has been a general practice to limit the exposure so that the greatest magnitude of film density has been 1.5 on the H & D scale. This is a scale evolved for guidance in radiography. Photographic density on the H & D scale refers to the logarithm of the reciprocal of the transmission of light through the photographic image. Thus if the photographic image transmits $\frac{1}{10}$ of the light incident on it, it has a density of unity as indicated by the formula $$\text{Density} = \log\left[\frac{1}{\text{transmission}}\right]$$

That is $$\text{Density} = \log \frac{1}{1/10} = \log 10 = 1$$

In the same way if the photographic image transmits $\frac{1}{100}$ of the incident light $$\text{Density} = \log = \frac{1}{1/100} = \log 100 = 2$$

Other values in this H & D scale are similarly determined. When such heretofore appraisable maximum density of 1.5 produces a film in which some of the thicker parts of the X-rayed object may be adequately observed with former illuminators, other thinner parts would be of such density as to be beyond proper viewing and appraisal under the maximum lighting of such illuminators.

When two adjacent portions of an object produce only a small difference in the absorption of the X-ray beam, the resultant image in the radiograph will have only slight differences in density for the two adjacent regions. The ability of the observer to distinguish such small differences in density increases as the total density of the image on the film is increased provided there is sufficient illumination of the denser films, or film portions. With sufficient illumination of the whole of such a denser film, or any denser parts or adjacent portions thereof. The observer is thus able adequately to distinguish and appraise in the image on the film regions of the object which as heretofore exposed and illuminated have had an unobservable or unappreciable small difference in absorption of the X-ray beam or have been so dense as to be beyond the power of the illuminator and therefore not successfully observable or appreciable.

With the use of this invention exposures may be used which produce film densities far in excess of those heretofore used as a maximum properly viewable, that is, intensity of illumination as much as four times that available heretofore in illuminators may be applied to the whole film, or sixteen times as much to small areas of the film. In the construction as shown, with the light bulbs close to the film and the reflectors used, the intensity of illumination over the whole film is substantially 1600 candle power and substantially 6400 candle power over the smaller spot illuminator for a limited area of the film (tested by a photometer). As a result the present invention will provide a sufficiently wide range of intensity of illumination so that whole films or sections thereof may be readily viewed, studied and appraised, which were beyond the lighting capacity of former illuminators, and in the present invention this may be accomplished by varying the maximum intensity of the source of light of the illuminator while adequately preventing any increase in heat energy from injuring the viewing mechanism or the films.

By the use of longer exposures and greater amounts of X-radiation incident on any object or any part thereof images of flaws such as referred to above may be caused to have the desired contrast with images of the surrounding portion of the article, and by the use of adequate illumination greatly increased contrasts may be readily viewed and appraised which would not even be visible with the ordinary illuminating device.

In cases where it is necessary to radiograph an object of variable thickness the resulting film will be a combination of light and heavy densities depending on the amount of X-ray absorption at given points. The present invention permits of using such exposure as will give the required maximum density and of viewing the varying densities with maximum efficiency, in that this invention provides means for variably controlling the density of illumination to accord with the density of the film being viewed, and to give such illumination as will permit of studying and appraising the film under the most desirable conditions, either as to portions of lighter density or portions of heavier density; and the invention therefore makes it possible to study properly the film and appraise an object, whether requiring a small amount or a large amount of X-ray radiation and whether the film requires a high or low light intensity.

A preferred embodiment of apparatus of this invention is illustrated, and with this apparatus a wide range of intensity of illumination has been found satisfactorily usable, and yet in spite of the large amount of illumination provided, the illuminated surfaces are maintained sufficiently cool, even when operated continuously, so that films will not curl or buckle and may be viewed sequentially without damage to the illuminating device and without damage to the films.

The apparatus comprises a box or casing designated generally by the numeral 10 and having a top with louvers 35—35', a back with a removable panel 11 which is held in position by suitable fastenings 11' and which covers an opening of sufficient extent to permit the operator to mount and dismount the light fixtures, two removable sides 13G, a base and a front the greater portion of which is occupied by a glass viewing plate 15. An opening is provided in the front of the box to receive this viewing plate. As shown this viewing plate 15 is satisfactorily translucent to visible light emanations, very satisfactory results in operation being attained when the plate 15 is substantially 14 by 17 inches, the usual size of film used in radiography and is of opal glass, or glass opalized on one side. With such size plate the whole of a usual size 14 by 17 inch film may be viewed at one time.

Within the box and directed toward the plate 15 is a reflector 12 in which are mounted a pair of electric bulbs 16, light from which is thrown by the reflector, upon the plate. The means by which the reflector and the plate are mounted in the box is shown in Figs. 5 and 10, of which Fig. 5 is a detailed cross section through the left hand front corner of the box as seen in Fig. 1, and Fig. 10 is a detailed cross section through the mounting of the right hand end of the glass plate 15, the showing in each figure being illustrative of a convenient and satisfactory construction which may be economically manufactured and assembled, or disassembled when access to the interior of the mechanism is desired or required for repair, etc. Looking now at Fig. 5 the illustrative construction is shown as comprising a side wall 130 of the box, bent at right angles to form a front flange 131 to the inside of which is attached by welding or the like a vertical spacer and support 136 which is angle shaped, one side of the angle serving for attachment to the flange 131 and the other serving as a support for the reflector. Outside the corner formed by the flange 131 there is fixed an angle shaped member 132 which may be chromium-plated or otherwise decorated and which adds appearance and strength to the corner of the box. This corner brace or angular strip is attached to the side wall 130 by screws 133, and which for simplicity of disclosure are omitted from Figs. 1, 3 and 8; and this strip may be readily attached or detached and the side walls 130 applied for assembly or removed for access to the interior of the box 10 and the mechanism therein.

As seen at Figs. 1 and 10 metal plate 137 extends from the top to the bottom of the box and is suitably cut away as indicated at 83 in a manner to be hereinafter more fully disclosed. Mounted vertically on the edge of plate 137 is a strip 138 which is held in place by screws 139. Attached to the inside of the metal plate 137 adjacent the left-hand edge thereof as viewed in Fig. 1 is an angle support 140 similar in its construction and method of attachment to angle support 136. The reflector 12 has diverging top and bottom parts 25—26 and parallel sides 27—28. Across and below the bottom of the left-hand opening in the box and extending the full extent thereof is an angle shaped member 31 which serves as a support for the glass plate.

The sides 27 and 28 of the reflector 12 are extended forwardly as indicated at 27′ and 28′ and the outer ends are offset in order to remove the attaching screws 134 from the line of light and prevent the throwing of shadows on the viewing plate 15. The ends of these extended sides are bent over to form flanges 135 and 28″ which with the cooperating parts 131 and 138 respectively form grooves to hold the edges of the plate 15 in position, the bottom of the plate resting on the supporting flange 31. When the device is being assembled the plate 15 is not emplaced until the reflector 12 has been put in position. The size of this reflector is such in its over-all dimensions that it can be placed in the box through the front opening before the strips 131 and 138 have been mounted. The reflector having been placed inside the box it is attached to the uprights 140 and 136 by screws 134 and assumes the position shown in Fig. 4.

At the forward ends of the parts 25 and 26 of the reflector there is mounted a heat baffle 30 which may conveniently be glass of a type which permits visible light to pass and intercepts heat and heat radiations. This glass is mounted between spring clips 32 which are attached to the members 25 and 26 and hold it resiliently against rotating or movement in use and transportation of the device, the weight of this glass plate is supported primarily upon metal plates 372 affixed, as by welding, to the side walls 27, 28 of the reflectors. At their rear ends the top and bottom parts of the reflector are flattened out as shown at 25′—26′ to receive a channel shaped mounting or support 21 for the light bulbs 16—16, these substantially parallel portions 25′—26′ having enough springiness or flexibility to hold the support 21 firmly when pushed into position between them. The lights, their sockets, a light diffuser plate and supports therefor are carried as a unit on the support 21 which is frictionally held by the resilience of the members 25′—26′. This mounting is pushed into place from the rear through the elongated opening, in the back of the casing, when the covering plate 11 is removed and it may be as readily pulled out for replacing bulbs 16, etc.

Positioned back of plate 30 are the two electric bulbs designated 16 which are mounted in a double socket member 18, which in turn is supported in a cylindrical holder shown as a T-section of pipe 19, this in turn having threaded into it a pipe nipple 20, the other end of which extends through an opening in the support 21 to which it is fastened by inside and outside lock nuts both designated by the numeral 22.

The support 21 carries two clamp members or projections 60—60′. These members, as shown for example in Fig. 4, are united and held between the portion 21 and the inner lock nut 22 and extend forwardly to receive between their front ends a diffuser plate 62 which is interposed between the light bulbs and the plate 30 and tends to diffuse light from the bulbs so that concentrated light does not impinge directly upon the plate 30 and viewing plate 15 but light rays from very high intensity spots of light emanation are intercepted and broken up or diffused so that more uniformity of intensity of illumination will be effective upon the glass plate 15. By means of such diffuser and the reflecting inclined and side walls which house the lamps 16—16′ the maximum intensity of diffused light will be thrown upon the opal glass plate, and by means of the voltage regulator 56—57 (Figure 1), the intensity of the illumination from the bulbs 16—16′ can be increased or decreased to meet the varying conditions of film density being viewed. It is thought unnecessary to describe the internal construction of the voltage regulator 56, as a suitable variable voltage auto transformer, such for example as that commonly known in the trade as "Variac," is available and well understood.

The light bulbs shown and preferably used are of the photo flood type each providing 250 watts of illumination, are positioned closely adjacent the viewing plate, and as the interior of the reflector is painted with a paint having a very high reflecting factor, the visible light rays may be directed against the opal viewing plate 15 to provide a substantially uniform intensity of illumination, over the whole of a 14 by 17 inch film, which is approximately four to five times that heretofore used in viewing such X-ray films; and with such films will give adequate illumination so that they may be adequately and substantially uniformly illuminated and viewed and appraised at densities heretofore non-usable.

It should be borne in mind that seemingly small variations on the H & D scale represent quite large variations in illumination required. For example, adding 1.0 to the H & D scale density requires ten times as much illumination. And the 1600 candle power referred to above is satisfactory for ordinary film contrasts substantially up to 3.8 on the H & D scale, whereas an increase in density to approximately 4.4 can adequately be viewed only with the spot illuminator of approximately the 6400 candle power above referred to. The nature of the object radiographed affects contrast in density which may affect the intensity of illumination required; but, generally, the densities referred to may be adequately appraised under the intensities of illumination stated. In fact, the figures given are conservative; for example, densities of 4.5 have been satisfactorily viewed and appraised with the 6400 candle power spot illuminator.

Reflector 12 and the support 21 are suitably painted to withstand the temperatures to which subjected, and the inner surfaces exposed to emanations from the closely adjacent light bulbs 16 are painted with a suitable heat resistant and highly reflective white paint. As a result of this, substantially all of the light emitted by the bulbs 16, 16' or at least such a greatly preponderant part thereof as to give in practice substantially uniform lighting of the plate 15, is transmitted directly and by reflection toward the opal glass viewing plate 15 to provide high intensity illumination thereof per unit area.

As shown, the heat absorbing plate 30 is spaced a short distance, about an inch being usually found sufficient, back of the opal glass plate, thus providing a space extending from the bottom of the housing, and to the left of the dividing partition 37, as shown in Figs. 3, 4 and 8, through which cooling air may be forced, passing from the bottom up, as shown in Fig. 4, and then out through the louvers 35 which are formed in the top of the casing.

Beneath the bottom 26 of the reflector is an angular partition 37 the extreme front of which extends back from the front wall and the rear portion of which is angularly bent so as to be diagonally placed as shown in Fig. 8 and which increases in height from the front to rear since it conforms to the shape of the bottom of the reflector. A narrow baffle 371 is placed above the top of the fan housing 42' and extends from the rear portion of the member 37 to the right side wall of the casing and serves to assist in directing the air flow from the fan 40' so that the air will be blown effectively over the small area—very high illumination part of the illuminating mechanism positioned in the space at the right of the large illuminator chamber behind the viewing plate 15. There are two high speed air circulating fans 40—40' shown, one for each side of the casing and furnishing air to the light chambers on the left and right sides of the chamber respectively. Both fans are alike in construction and operation. For example, the fan 40, as shown in Figs. 3 and 4, is of approximately an 8 inch size and is rated for continuous operation so that whenever the lamps 16, 16' are illuminated, a sufficient current of air will be blown in through the housing 42, with which the fan 40 is associated, across the bottom of the reflector portion 26, up through the space between the plates 15 and 30 at such a rate that sufficient heat energy will be absorbed from the heat absorbing plate 30 and also from the inside of the illuminated viewing plate 15 so that the temperature of both plates will be kept low enough to avoid any damage or injury to the apparatus and in addition the temperature of the plate 15 will be kept sufficiently low so that X-ray film may be placed and held firmly against that plate 15 without becoming unduly heated and without resultant damage.

The heat absorbing glass may be of character as known on the market for absorbing non-luminous radiant energy, while at the same time absorbing only a small percentage of the visible light rays. A glass of this sort can be obtained which will absorb sufficient of the non-visible radiation impinging upon it to prevent an objectionable quantity of heat energy passing therethrough to adversely affect the illuminated viewing screen or plate or the X-ray film thereagainst while permitting passage of a large preponderant part of the luminous waves which impinge upon it. Of course, glasses of various kinds may be used for the plate 30 which will vary somewhat as to their transparency to visible radiation and to non-visible radiation, and in the efficiency of transmission of visible light to impinge upon the opal glass while absorbing or reflecting back into the light enough of the heat energy emanating and reflecting means resulting from emanations from the light source so that most of the heat energy can be dissipated by the current of air forced between the two glass plates by the fan 40 and the amounts of radiant energy so removed or dissipated and the amount of visible light impinging on the viewing screen will determine the relative efficiency of the apparatus as to permissible intensity of the illumination per inch area on the plate 15. But it has been found that either opal glass or glass which has been opalized on one side can be used for the plate 15, and when a quality of glass which is adequately heat absorbing but light transparent glass is used for the plate 30, the resultant coordination of parts in the mechanism and heat energy removal therefrom will readily permit of securing sufficient intensity from two 250 watt photo flood lamps to permit of adequately illuminating and accurately viewing and diagnosing X-ray film having densities as high as not less than about 3.8 on the H & D scale.

The voltage regulator or control 56, which is shown in dotted lines in Figs. 1, 2 and 6 has an operating handle 57 outside the box 10, by means of which the setting of the current control may be varied so that the light emitted by bulbs 16 may be varied by stepless adjustments, as desired. Very satisfactory results have been secured with the apparatus illustrated and the with the voltage control so constructed as to give a desired range of voltage variation from 0 to the maximum voltage utilized for the operation of the illuminator in this invention. As shown diagrammatically in Fig. 2 a dial portion 58 for this voltage regulator is marked on the outside of the casing, a range of from 60 to 130 volts, and this range will ordinarily be found satisfactory to meet the usual operating conditions. This voltage regulator is positioned in the compartment space 13, to the right of the partition 37, as viewed from the front.

The fan 40 is positioned or mounted adjacent to an opening 42 in the back of the illuminator casing, and is so constructed that, in the apparatus as shown, it will cause a circulation of approximately 900 cubic feet of air per minute across the bottom of the compartment 12, up between the glass plates 15—30, and out through the louvres or exhaust openings 35. This amount of circulating air is sufficient to prevent undue heating of the opal glass plate 15 when each of the bulbs 16—16 is a No. 1 photo-flood lamp of 250 watts, as described. The fan 40' is similar in mounting construction and function. Also each of the fan openings is shown covered by a wire mesh screen to protect against accidental injury to the operator and prevent ingress of objectionable objects or materials which might injure the fans or other parts of the mechanism. These screens are indicated by the cross-lined portions shown at the bottom of each fan opening.

Preferably the casing is provided adjacent the upper edge of the glass plate 15 with a plurality of spring members 48, each having a roller 49, which are so arranged that they will exert sufficient spring pressure against the upper end of the glass plate to permit of inserting the upper end of the film beneath these rollers and to hold it suspended so that the film may be held flat against the glass 15 while it is being viewed.

In the right hand portion of the casing 10, as viewed from the front, another photo flood lamp 70 is mounted in a suitable socket 71 which is mounted at the rear of the reflecting chamber 72, in the nature of a spotlight; the inner surface of this reflecting chamber being treated to be highly reflective of visible emanations from the bulb 70. Suitable results, and a very high degree of reflective capacity, have been attained by applying a highly reflective silver surface to all the inner walls of this reflecting chamber 72 so that substantially all the light is directed forwardly toward the plate 83, thus giving a very high concentration of light over a small area. The reflecting chamber is provided with a plurality of radiating fins 73, for dissipating heat received, during operation, from the bulb. Also, this reflecting chamber, with the lamp carried therein, is constructed to be supported from a water cell, designated generally by the numeral 74, the front end of which is supported from the front wall of the casing 10, and the light source is close to the viewing plate which insures concentration of the light for high intensity illumination on the plate 83.

As shown, the water cell 74 comprises a horizontally arranged cylinder having an expansion chamber 74' of the Sylphon type to compensate for expansion and contraction of the fluid in the water cell under varying temperatures during operation. The water cell has a plurality of heat dissipating fins 80, over which the air from the fan 40' sweeps to affect cooling of the water, in the cell, which is absorptive of the non-visible heat rays and transparent to the visible rays, and may thus be effectively cooled in operation. The cylinder 74 carries at its front end a flange 81, and at its rear end a somewhat similar flange member 82, which however, as shown, is of larger diameter than the flange 81. The front end of the water cell 74 is circular. Against the circular front end of the water cell rests a circular gasket 84. Against the circular gasket 84 is a plate 83 as of plastic which is unaffected by the fluid in the cell and the intense light which illuminates it. A plate of methyl methacrylate such as the material well known as "Plexiglas" is satisfactory in use. Against the transparent plate 83 is a metal plate 85 having spring arms 87—88 bent slightly backward and having slots 92—93 respectively at the ends of the upper and lower arms or extensions 87—88 respectively. As shown the upper slot is arranged vertically and the lower slot 93 substantially horizontally. Bolts 86 pass through the plate 85 and the flange 81 and hold the parts in sealing relation, and sufficiently to support the water cell and light assembly. The member 85 has an opening as large as the interior of the cell. Screw threaded studs 90—91, which are welded to the front wall of the casing 10, are adapted to engage in slots 92 and 93 when arms 87 and 88 are slid under nuts 94—95 on said screws, and said nuts may be tightened to hold said arms in place. By this arrangement of the slots, as described, the supporting plate may be readily removed by loosening the nut 95 and giving a small angular swing to the plate member, and the entire plate and water cell and light assembly thus readily removed or replaced through the opening covered by the plate 11.

The rear end of the water cell 74 supports a sleeve 110 having a rear flange 115, and a front flange 101 which latter has threaded openings therein to receive the adjusting screws or bolts 100, which are positioned through openings in the flange 101 and the flange 82 at the rear end of the water cell. The rear end of the water cell is likewise sealed in watertight relation, by means of a glass plate 102, which is held between a gasket of rubber or the like 103 on the cell, and a similar gasket 103' against the cooperating face of the flange 101. Tightening of the screws or bolts 100 will then pull flange 101 toward the end of the water cell to clamp the glass plate 102 tightly in position between the gaskets, to give a water tight connection. This flange 101 is preferably circular and is provided with a circular opening which overlies the periphery of the glass plate 102, and the gaskets 103' and tightening of the bolts 100 will pull the flanges 101 and 82 together against the respective cooperating gaskets 103—103' and the glass plate 102 is thus sealed tight against the rear end of the water cell and the sleeve is fastened to the rear end of the water cell. However, since the plate 102 is of glass and exposed directly to the heat generated by the bulb 70, it is of heat resistant glass as described above in connection with plate 30.

Figure 7:
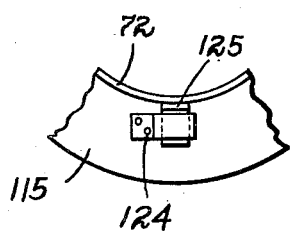
Fig. 7 is a fragmentary detail showing the detachable means for latching or holding the interconnection of the light reflecting chamber and the water cell.

The sleeve 110 has an inside diameter which is approximately the same or very slightly smaller than the outside diameter of the slotted front end of the lamp chamber 72, and is adapted to receive and hold the front end of the lamp chamber 72 in operative position. The flange 115 has a latch member 124 (Figs. 6 and 7) formed of a metal strap offset or bent about midway so that when one part is attached, as by spot welding, to the flange 115 the other part is spaced therefrom to provide a latch space into which the locking lug or catch 125 on the lamp supporting chamber 72 may be readily moved into position therein to hold the parts in assembled relation. The cylindrical chamber is projected into the sleeve 110 and a part turn will then bring the catch 125 under the latch member 124.

The fan 40' is mounted to the right of the baffle 37, as seen from the front, in the back wall of the box and within a cylindrical housing 42' corresponding to housing 42 about fan 40. When this highly concentrated, or spotlight, portion is being used the fan 40' is simultaneously energized and its draft is directed over the water cell and spotlight assembly, flowing over the fins 73 of the light reflector, and the fins 80 of the water cell and over the expansion chamber and out through the louvers 35'. In this way the heat from the bulb and that absorbed by the water is adequately dissipated and the film is protected even against the very intense light and heat rays emitted by the bulb 70.

The detachable strip 138, as shown in Fig. 10, when bolted in position, and having one edge overlying the large plate 15 to hold it in assembled relation, has the other edge portions overlying but spaced from the overturned flange of member 140. This overturned flange and the cooperating edge of the strip 138 receive between them a metal panel 137, which closes the front of the space in which the water cell 74 and associated parts above described are positioned, this panel 137 being preferably of sheet metal properly enameled, to correspond with the remainder of the sheet metal utilized in forming the parts of the body or container for the illuminator. As shown also in Figs. 1, 8 and 10, the panel 137 has attached at each side a guide member each designated by the numeral 185, each of which may be welded or otherwise attached to the front of the panel. As shown most clearly in Fig. 10 this guide member 185 is bifurcated, in cross section, to provide two spaced portions 186, 186' adapted to receive the slidable plates 180 and 181 therebetween, the portions 186 and 186' being made of sufficiently resilient metal, and the space between them so dimensioned, so that these two portions 186 and 186' will act to exert a resilient or springy grip upon the edges of the slides 180 and 181. These slides may thus be moved up and down in the guide ways between 186 and 186', by manual operation, and will remain in any adjusted position due to the frictional grip upon them.

As shown in Fig. 1 the guide ways upon the plates 185 have their edges spaced from each other so that the smaller opening 182 and larger opening 183 in the slides 180 and 181 respectively will be positioned between the edges of the parts 186 and 186', and have their vertical diameters substantially the same as the vertical diameter of the viewing plate 83. Likewise the members 186 and 186' are cut away, approximately midway their vertical height so that the distance between them in the zone of the viewing plate 83 will substantially coincide with the effective outside dimensions of the viewing plate to provide an opening which corresponds with the effective cylindrical viewing area of the plate 83, as indicated in Fig. 1 by the numeral 83'.

As shown in Fig. 1, the slides 180 and 181 are separated so that the entire cylindrical area of the viewing plate 83 is available for use to view a portion of film corresponding in area with the circular viewing portion of 83. If it is desired to view a somewhat smaller area of a film the slide 181 may be pushed up until its opening 183 is opposite the viewing plate 83 and an area of the film corresponding to the opening 183 will then be viewable. Likewise if it is desired to view a still smaller area, the slide 180 may be pushed down in the guide ways until the opening 182 is properly before the viewing plate 83. In this way small areas of the large film may be viewed under the very much larger intensity of illumination referred to above. Furthermore by manipulating the slides 180 and 181 they may be caused to more or less overlie the effective illuminating area of the plate 83 and thus provide substantial horizontally arranged bands of light across the viewing plate, which may be of any width from the merest crack to increasingly wider bands up to the full diameter of the illuminating portion of the plate. Also, by means of this construction the blocking off of any portion of the viewing plate 83 by the slides 180 and 181 is completely effective to prevent diffusion of light which would be undesirable, the construction being such that the film may be positioned tightly against the outer surfaces of the slides so that there can be no diffusion of light around the edges to effect clear viewing and appraisal of the film.

In Figs. 1, 2 and 3 is shown a small light covering hood 190 with a cooperating switch 191, positioned over an opening in the side 130, above the adjusting knob 57, this hood having enclosed within it a colored light which illuminates the markings upon the side 130, serving as a guide for positioning of the adjusting knob 57, so that these adjustments for the current regulator may be observed, as under dim red light, in a dark room so as to have the minimum effect upon the capacity of the operator's eyes for visually observing and appraising the films.

In Fig. 9 is shown a wiring diagram wherein P represents an electric plug adapted to be connected to a source of power such as an ordinary lighting circuit, and L represents leads from the plug to a fuse box 154 suitably supported in the casing of the device. Main leads 141 and 142 issue from the fuse box, an open circuit socket 150 being interposed in lead 141. A plug 151 may be inserted in the socket, the plug having connection with a normally opened switch 152, this switch being suitably spring biased to open position and adapted to be closed by the foot pressure or other manual operation. Thus the circuit is broken at socket 150 when the plug is withdrawn, and with the plug in place, is closed only when the foot switch is positively actuated.

The leads 141 and 142 extend to the reactance 156, which may comprise a continuously variable auto transformer, having a variable tap 143 which provides for securing a variable voltage, depending upon the particular setting of the tap.

It is desired to provide for energization of each one of the light sources concurrently with energization of the fan with which it is associated, and during the time that that light and fan combination is operative, to prevent the possibility of energizing of the other light or its associated fan. Further it is desired to provide for application of a uniform voltage for the operation of the respective fans, while providing for the variable energization of the respective light sources, in accordance with the manually adjustable tap on the transformer, operated by its knob 57, to develop the amount of illumination desired. For this purpose a double pole, double throw switch is provided, the variable tap 143 on the transformer being connected to one center point of the switch through manual control switch 146 which may be utilized to render the illuminating means inoperative when desired.

Connection 160 supplies power to the other midpoint of the switch, which is provided with blade pairs 144, 144', and 145, 145'. When the switch is closed on its upper contacts as indicated in the diagram, line voltage is applied to a motor 40' through switch blade 144' and line 161, the return power being through line 162, and common junction connector 149 to the offset side of the line. Simultaneously a circuit is established from the variable tap 143 on the transformer through switch blade 144, and line 147 to lamp 70, the return power being through line 148, and connector 149 to the offset side of the line. Thus motor 40' is energized at uniform line voltage, lamp 70 is energized at the voltage corresponding to the seating of the variable tap on the transformer, and the other light source and motor are definitely disconnected and their energization prevented.

When the switch is thrown to close the lower line contacts, a circuit is established for motor 40 through switch blade 145', and line 175, the return being through line 176 to the common junction point 149. Simultaneously switch blade 145 closes to provide a connection from the variable tap 143, and line 55, to the lamps 16, 16', the return being into the common junction point. Thus in this position of the switch, motor 40 and its associated lamp 16, 16' are both energized, and the other lamp and fan combination is definitely deenergized. Control of the entire system is at all times provided by the foot switch 152, and no operation is possible except when the plug 151 has been inserted in operative position.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An illuminator for viewing X-ray films and the like, comprising a housing, a light transmitting viewing plate at one side of said housing against which an X-ray film may be viewed, a high intensity source of visible light located in said housing behind said viewing plate, said high intensity source of light being surrounded by an enclosure having its inner surfaces highly reflective of radiation from said light source and positioned to direct said radiations in a small diameter beam toward said viewing plate, cooling fins surrounding said light enclosure, a water cell comprising a metallic cylinder having cooling fins upon the exterior thereof, a closure for the rear end of said water cell which is transparent to visible light rays but substantially opaque to non-visible light rays, said viewing plate being attached as a closure for the front of said water cell, means for detachably connecting said water cell and said viewing plate to the front of the housing, means carried by the opposite end of said water cell for receiving and supporting the enclosure for said source of high intensity light, and means for controlling the effective film area illuminated by said light source and for preventing uncontrolled diffused lighting of said film areas.

2. An illuminator for viewing X-ray films and the like, comprising a housing, a light transmitting viewing plate at one side of said housing against which an X-ray film may be viewed, viewing a high intensity source of visible light located in said housing behind said viewing plate, said high intensity source of light being surrounded by an enclosure having its inner surfaces highly reflective of radiation from said light source and positioned to direct said radiations in a small diameter beam toward said viewing plate, cooling fins surrounding said light enclosure, a water cell comprising a metallic cylinder having cooling fins upon the exterior thereof, a closure for the rear end of said water cell which is transparent to visible light rays but substantially opaque to non-visible light rays, said viewing plate being attached as a closure for the front of said water cell, means for connecting said water cell and said viewing plate to the front of the housing, means carried by the opposite end of said water cell for receiving and supporting the enclosure for said source of high intensity light, and means for flowing cooling fluid over said water cell and light enclosure at a rate sufficient to remove heat energy therefrom to maintain the temperature thereof and of said viewing plate sufficiently low to avoid deleterious effects to the mechanism and also to the X-ray film.

3. An illuminator for viewing X-ray films and the like, comprising a housing, a light transmitting and diffusing viewing plate at one side of said housing against which an X-ray film may be viewed, a high intensity source of visible light located in said housing behind said viewing plate, said high intensity source of light being surrounded by an enclosure having its inner surfaces highly reflective of radiation from said light source and positioned to direct said radiations in a small diameter beam toward said viewing plate, cooling fins surrounding said light enclosure, a water cell comprising a metallic cylinder having cooling fins upon the exterior thereof, a closure for the rear end of said water cell which is transparent to visible light rays but substantially opaque to non-visible light rays, said viewing plate being attached to a closure for the front of said water cell, means for detachably connecting said water cell and said viewing plate to the front of the housing, and means carried by the opposite end of said water cell for receiving and supporting the enclosure for said source of high intensity light, the intensity of said source of high intensity light and the means for effecting concentration of visible light emanations therefrom upon said viewing plate being coordinated to give such illumination of a small area of X-ray film held against said viewing plate as will permit viewing and appraising areas of film of densities on the H & D scale which are substantially above 3.8 on the H & D scale in density.

4. An illuminator for viewing X-ray films and the like, comprising a housing, a light transmitting and diffusing viewing plate at one side of said housing against which an X-ray film may be viewed, a high intensity source of visible light located in said housing behind said viewing plate, said high intensity source of light being surrounded by an enclosure having its inner surfaces highly reflective of radiation from said light source and positioned to direct said radiations in a small diameter beam toward said viewing plate, cooling fins surrounding said light enclosure, a water cell comprising a metallic cylinder having cooling fins upon the exterior thereof, a closure for the rear end of said water cell which is transparent to visible light rays but substantially opaque to non-visible light rays, said viewing plate being attached as a closure for the front of said water cell, means for connecting said water cell and said viewing plate to the front of the housing, means carried by the opposite end of said water cell for receiving and supporting the enclosure for said source of high intensity light, the intensity of said source of high intensity light and the means for effecting concentration of visible light emanations therefrom upon said viewing plate being coordinated to give illumination intensity up to 6400 candle power against said viewing plate, means for flowing cooling fluid over said water cell and light enclosure at a rate sufficient to remove heat energy therefrom to maintain the temperature thereof and of said viewing plate sufficiently low to avoid deleterious effects to the mechanism and also to the X-ray film, and means for varying the area of film to be viewed and constructed to prevent uncontrolled diffused light from being effective on the film areas.

5. In an illuminator for viewing X-ray films and the like including a casing adapted to receive a source of light and having a viewing aperture in one side thereof provided with a light transmitting and diffusing viewing plate against which an X-ray film may be viewed, means providing a second viewing aperture in said casing substantially smaller than said first named aperture, a housing adapted to support a high intensity source of light and having inner surfaces highly reflective of light from a source mounted therein, a high intensity source of light within said housing, said housing being positioned within said casing to direct light from a source mounted therein in a small diameter beam towards said small viewing aperture, said housing being provided externally with cooling fins, a water cell comprising a metallic cylinder having cooling fins upon the exterior thereof, light transmitting closure members for the rear and front ends of said water cell, means for detachably mounting said water cell within said casing with said front closure member substantially coinciding with said small viewing aperture, means carried by the rear end of said water cell for supporting said housing, and means for flowing cooling fluid over said water cell and housing to carry off heat therefrom.

6. An illuminator for viewing X-ray films and the like including a casing provided with a small viewing aperature in one side thereof against which an X-ray film may be viewed, a housing adapted to support a high intensity source of light and having inner surfaces highly reflective of light from a source mounted therein, a water cell comprising a metallic cylinder having cooling fins upon the exterior thereof, light transmitting closure members for the front and rear ends of said water cell, means for mounting said water cell within said casing with said front closure member substantially coinciding with said small viewing apparatus, a source of high intensity light within said housing means carried by the rear end of said water cell for supporting said housing in position to direct light from said source mounted therein in a small diameter beam towards said small viewing aperture, means for energizing said light source, and means coupled with said energizing means for directing flow of air over said water cell and housing to carry off heat therefrom when said named light source is energized.

DAVID SUSSIN.

REFERENCES CITED

The following references are of record in the file of this patent:

UNITED STATES PATENTS

| Number | Name | Date |
|---|---|---|
| 768,827 | Stewart | Aug. 30, 1904 |
| 1,000,231 | Bowles | Aug. 8, 1911 |
| 1,208,387 | Scheckerling | Dec. 12, 1916 |
| 1,500,867 | Glover | July 8, 1924 |
| 1,576,557 | Strully | Mar. 16, 1926 |
| 1,797,322 | Callender | Mar. 24, 1931 |
| 1,846,533 | Thompson | Feb. 23, 1932 |
| 1,891,498 | Borden | Dec. 20, 1932 |
| 1,988,654 | Haag | Jan. 22, 1935 |
| 1,989,803 | Hoben | Feb. 5, 1935 |
| 2,012,940 | Buck | Sept. 3, 1935 |
| 2,038,784 | Ghadiali | Apr. 28, 1936 |
| 2,079,373 | Jordan | May 4, 1937 |
| 2,188,294 | Ganoung | Jan. 23, 1940 |
| 2,242,525 | Kirlin | May 20, 1941 |
| 2,279,084 | Tillyer | Apr. 7, 1942 |

Certificate of Correction

Patent No. 2,534,637 December 19, 1950

DAVID SUSSIN

It is hereby certified that error appears in the printed specification of the above numbered patent requiring correction as follows:

Column 11, line 50, for the word "larger" read *higher*; column 13, lines 41 and 42, strike out "viewing"; column 14, line 9, for "to a" read *as a*; column 15, line 28, after "housing" insert a comma; column 16, line 3, after "directing" insert *a*;

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*